(12) United States Patent
Moteki et al.

(10) Patent No.: US 9,116,245 B2
(45) Date of Patent: Aug. 25, 2015

(54) DOSE RATE MEASUREMENT SYSTEM

(71) Applicant: Mitsubishi Electric Corporation, Chiyoda-ku (JP)

(72) Inventors: Kenichi Moteki, Osaka (JP); Toshihide Aiba, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 216 days.

(21) Appl. No.: 13/966,609

(22) Filed: Aug. 14, 2013

(65) Prior Publication Data

US 2014/0312228 A1 Oct. 23, 2014

(30) Foreign Application Priority Data

Apr. 19, 2013 (JP) ................. 2013-088287

(51) Int. Cl.
*G01T 1/02* (2006.01)

(52) U.S. Cl.
CPC .. *G01T 1/02* (2013.01); *G01T 1/023* (2013.01)

(58) Field of Classification Search
CPC ............................................. G01T 1/02–1/026
See application file for complete search history.

(56) References Cited

U.S. PATENT DOCUMENTS

| 7,456,405 | B1* | 11/2008 | Iwatschenko-Borho et al. | 250/339.02 |
| 2008/0315110 | A1* | 12/2008 | Iwatschenko-Borho et al. | 250/394 |
| 2009/0057562 | A1* | 3/2009 | Heijne et al. | 250/370.07 |
| 2013/0277563 | A1* | 10/2013 | Giarmana | 250/366 |

FOREIGN PATENT DOCUMENTS

JP 61-104282 A 5/1986

* cited by examiner

*Primary Examiner* — Casey Bryant
(74) *Attorney, Agent, or Firm* — Buchanan Ingersoll & Rooney PC

(57) ABSTRACT

In order to provide a high accuracy radiation dose rate measurement system by good energy characteristics without deteriorating the original energy characteristics of a low dose rate range due to widening range, the dose rate measurement system is composed of: a radiation detector which sends a discrete current pulse having electric charge proportional to incident radiation energy and a DC voltage in which a DC current proportional to the radiation energy is converted; a high voltage power source which supplies a high voltage that operates the radiation detector; and a measurement unit in which the current pulse and the DC voltage are applied from the radiation detector to be converted to a low range dose rate and a high range dose rate respectively, and the low range dose rate and the high range dose rate are switched to be sent depending on the dose rates.

4 Claims, 8 Drawing Sheets

DOSE RATE MEASUREMENT SYSTEM

BACKGROUND OF THE INVENTION

1. Field of the Invention

The present invention relates to a radiation dose rate measurement system to be installed in nuclear reactor facilities spent fuel reprocessing facilities or the like, and around such facilities.

2. Description of the Related Art

In order to measure dose rates over a wide range from a natural radiation level to a high radiation level during a fault of a nuclear reactor or the like at both the inside/outside of nuclear reactor facilities, a plurality of dose rate measurement systems according to radiation levels need to be used in view of sensitivity and accuracy. Accordingly, it is required to enable measurement which responds to wide range dose rates by a single dose rate measurement system.

For example, in a gamma ray irradiation dose measurement system of a wide range described in JPS61-104282A, irradiation dose rates over a wide range can be measured by a single measurement system by providing a lead shield with special structure to a sodium iodide activated by thallium (NaI(Tl)) scintillation detector and by automatically selecting measurement by a discrimination bias modulation (DBM) measurement method (pulse height discrimination bias modulation method) by a pulse signal proportional to an irradiation dose of incident gamma ray from the detector at a low dose rate or measurement by a current measurement method at a high dose, depending on the level of an irradiation dose rate at a measurement place.

More specifically, the gamma ray irradiation dose measurement system includes: the NaI(Tl) scintillation detector which absorbs incident radiation energy, sends a discrete current pulse having electric charge proportional to the absorbed energy, and converts a direct-current (DC) current to a direct-current (DC) voltage to be sent; and a measurement unit in which the current pulse and the DC voltage are applied to be converted to dose rates to be sent. The measurement unit includes: a preamplifier which converts the current pulse to an analog voltage pulse to be sent; a main amplifier which amplifies the analog voltage pulse and removes high frequency noise; a DBM circuit in which the amplified analog voltage pulse is weighed by a dose rate and sends pulses of cyclic frequency proportional to the dose rate; a voltage/frequency (V/F) converter in which the DC voltage is applied to be converted to pulses of cyclic frequency proportional to the voltage to be sent; a gate circuit in which these pulses are applied and switched to be sent; and a calculation section in which the output pulses of the gate circuit are applied to calculate a low range dose rate based on the pulse of the bias modulation pulse height discrimination circuit or a high dose rate based on the pulse of the V/F converter to be sent, and to switch the gate circuit by a set dose rate. Energy characteristics as errors generated depending on gamma ray energy are different between a low range dose rate and a high range dose rate, and switching is made by a fixed dose rate with respect that an optimum switching point between the low range dose rate and the high range dose rate is different depending on the gamma ray energy; and accordingly, a large level difference is generated at a switching point and thus the shield with special structure is provided on the NaI(Tl) scintillation detector in order to reduce the large level difference as much as possible.

However, in the gamma ray irradiation dose measurement system described in JPS61-104282A, both the error caused by the energy characteristics of the high dose rate range and the level difference generated at the switching point can be reduced to some extent by providing the shield with special structure on the NaI(Tl) scintillation detector; however, a problem exists in that the original energy characteristics of the low range dose rate deteriorate due to widening range.

BRIEF SUMMARY OF THE INVENTION

The present invention has been made to solve the above problems, and an object of the present invention is to provide a high accuracy dose rate measurement system by good energy characteristics in which the original energy characteristics of a low dose rate range do not deteriorate due to widening range and a level difference at a switching point between the low dose rate range and a high dose rate range is suppressed.

In order to solve the above problems, according to the present invention, there is provided a dose rate measurement system including: a radiation detector which absorbs incident radiation energy, sends a current pulse proportional to the energy, and sends a DC voltage proportional to the energy; means of generating a pulse height spectrum, which converts electric charge carried by the current pulse to an analog voltage pulse, extracts a pulse height value from the analog voltage pulse, and generates a pulse height spectrum from the pulse height value to be sent; means of calculating a low range dose rate, which converts the pulse height spectrum to a dose rate to be calculated as a low range dose rate in a fixed cycle; means of compensating energy characteristics, which measures fluctuation of the DC voltage, estimates average energy of the radiation, and derives an energy compensation coefficient; means of calculating a high range dose rate, which converts the DC voltage to a dose rate, and multiplies the converted dose rate by the energy compensation coefficient to be calculated as a high range dose rate in a fixed cycle; and means of switching dose rates, which switches to either the low range dose rate or the high range dose rate to be sent as a dose rate based on the ratio between the low range dose rate and the high range dose rate.

According to the dose rate measurement system of the present invention, an optimum switching point between the low range dose rate and the high range dose rate is determined by the ratio between a low dose rate and a high dose rate, whereby effects are achieved in that output energy characteristics are good over the whole energy of radiation to be measured, linearity is good in the whole of the measurement range, a level difference at a switching point is suppressed, and a high accuracy and wide range dose rate can be measured.

The foregoing and other object, features, aspects, and advantages of the present invention will become more apparent from the following detailed description of the present invention when taken in conjunction with the accompanying drawings.

DETAILED DESCRIPTION OF THE INVENTION

Hereinafter, dose rate measurement systems according to embodiments of the present invention will be described with reference to FIG. 1 to FIG. 8.

First Embodiment

Figure 1:
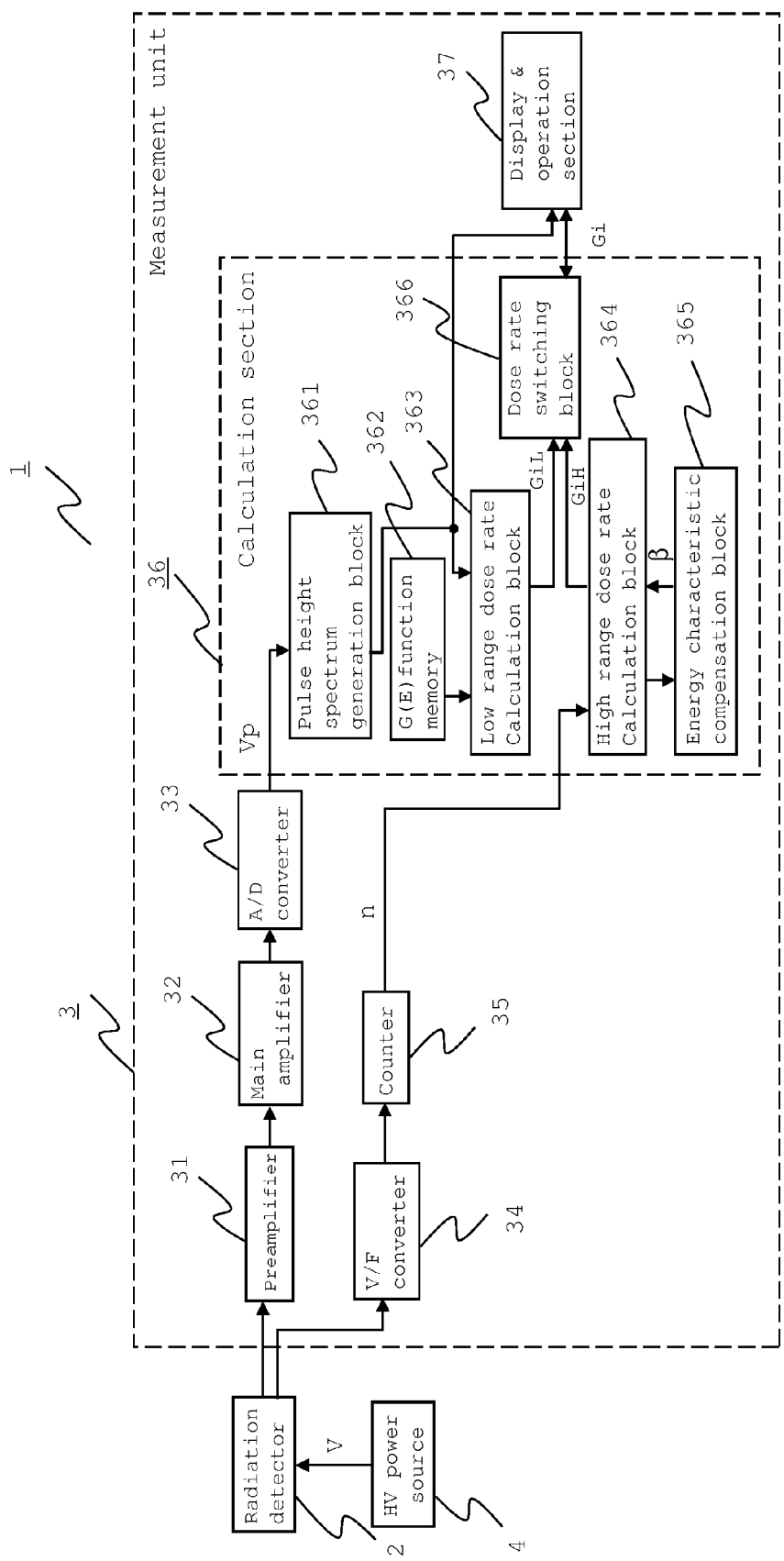
FIG. 1 is a diagram showing the configuration of a dose rate measurement system according to a first embodiment.

FIG. 1 is a diagram showing the configuration of a dose rate measurement system according to a first embodiment.

As shown in FIG. 1, a dose rate measurement system 1 is composed of: a radiation detector 2 which absorbs incident radiation energy, and sends a discrete current pulse having electric charge proportional to the absorbed energy and a DC voltage in which a DC current proportional to the absorbed radiation energy is converted; a high voltage power source 4 which supplies a high voltage that operates the radiation detector 2; and measurement unit 3 in which the current pulse and the DC voltage are applied from the radiation detector 2 to be converted to a low range dose rate and a high range dose rate respectively, and the low range dose rate and the high range dose rate are switched to be sent depending on the dose rates.

Next, the configuration and operation of the measurement unit 3 of the dose rate measurement system 1 will be described in detail. As shown in FIG. 1, the measurement unit 3 includes: a preamplifier 31, a main amplifier 32, an analog/digital converter (A/D converter) 33, a voltage/frequency converter (V/F converter) 34, a counter 35, a calculation section 36, and a display and operation section 37; and the calculation section 36 includes: a pulse height spectrum generation block 361, a G(E) function memory 362, a low range dose rate calculation block 363, a high range dose rate calculation block 364, an energy characteristic compensation block 365, and a dose rate switching block 366.

As means of generating a pulse height spectrum, the preamplifier 31 converts electric charge carried by a current pulse to an analog voltage pulse; the main amplifier 32 amplifies the analog voltage pulse sent from the preamplifier 31 and removes superimposed high frequency noise; the analog/digital converter (A/D converter) 33 measures a pulse height value Vp from the analog voltage pulse amplified by the main amplifier 32; and the pulse height spectrum generation block 361 generates a pulse height spectrum by the pulse height value Vp sent from the A/D converter 33 to be sent.

As means of calculating a low range dose rate GiL, the G(E) function memory 362 stores a table referred to as a G(E) function in which, for example, a measurement energy range of 50 to 3000 keV is divided into 10 to 600 channels (ch) and each ch(i) is made to correspond to a dose rate Gi (nGy/hcpm$^{-1}$); and the low range dose rate calculation block 363 divides $\Sigma Gi \cdot Ni$, in which the product of the dose rate Gi and number count Ni of each ch(i) of 10 to 600 ch measured in a fixed cycle is integrated according to spectrum data sent from the pulse height spectrum generation block 361, by a fixed cycle time to be calculated as the low range dose rate GiL, using the table.

As means of calculating a high range dose rate GiH, the high range dose rate calculation block 364 sends a counting rate r which is calculated by dividing an integrated counting value $\Sigma ni$, in which a counting value ni of a fixed cycle of the counter 35 is integrated over a fixed cycle time T, by the fixed cycle time T and calculates the high range dose rate GiH, in which the counting rate r is multiplied by a dose rate conversion coefficient η, to be sent. Furthermore, as means of compensating energy characteristics, the energy characteristic compensation block 365 requires a standard deviation σ based on a deviation from a movement average counting rate rav of a predetermined calculation periodic number including a relevant calculation period for the counting rate r sent from the high range dose rate calculation block 364, and calculates average energy Eav of radiation with fluctuation from the standard deviation σ. For example, the energy characteristic compensation block 365 preliminarily stores a corresponding table between the radiation average energy Eav and an energy compensation coefficient β, the corresponding table being made based on a type test, and collates the radiation average energy Eav and the energy compensation coefficient β of the corresponding table; and a high range dose rate GiH, which is energy-compensated by multiplying a calculated high range dose rate by the energy compensation coefficient β, is sent from the high range dose rate calculation block 364.

In this case, if the counting rate r is set to (cps), the standard deviation of the counting rate r is set to σ, a measurement time is set to T (sec), average electric charge per one phenomenon generated by the radiation detector 2 is set to Q(C), and an average value of a DC current at the measurement time T is set to Iav, the average electric charge Q, that is, the radiation average energy Eav can be estimated from the standard deviation σ of the counting rate r, the average current Iav, and the measurement time T as expressed by the following equation (1).

$$\sigma^2 r \cdot Q^2 / T = Iav \cdot Q / T \qquad (1)$$

As means of switching dose rates, the dose rate switching block 366 switches between the low range dose rate GiL and the energy-compensated high range dose rate GiH to be sent, based on the ratio GiH/GiL between the low range dose rate GiL from the low range dose rate calculation block 363 and the high range dose rate GiH from the energy-compensated high range dose rate calculation block 364.

Figure 2:
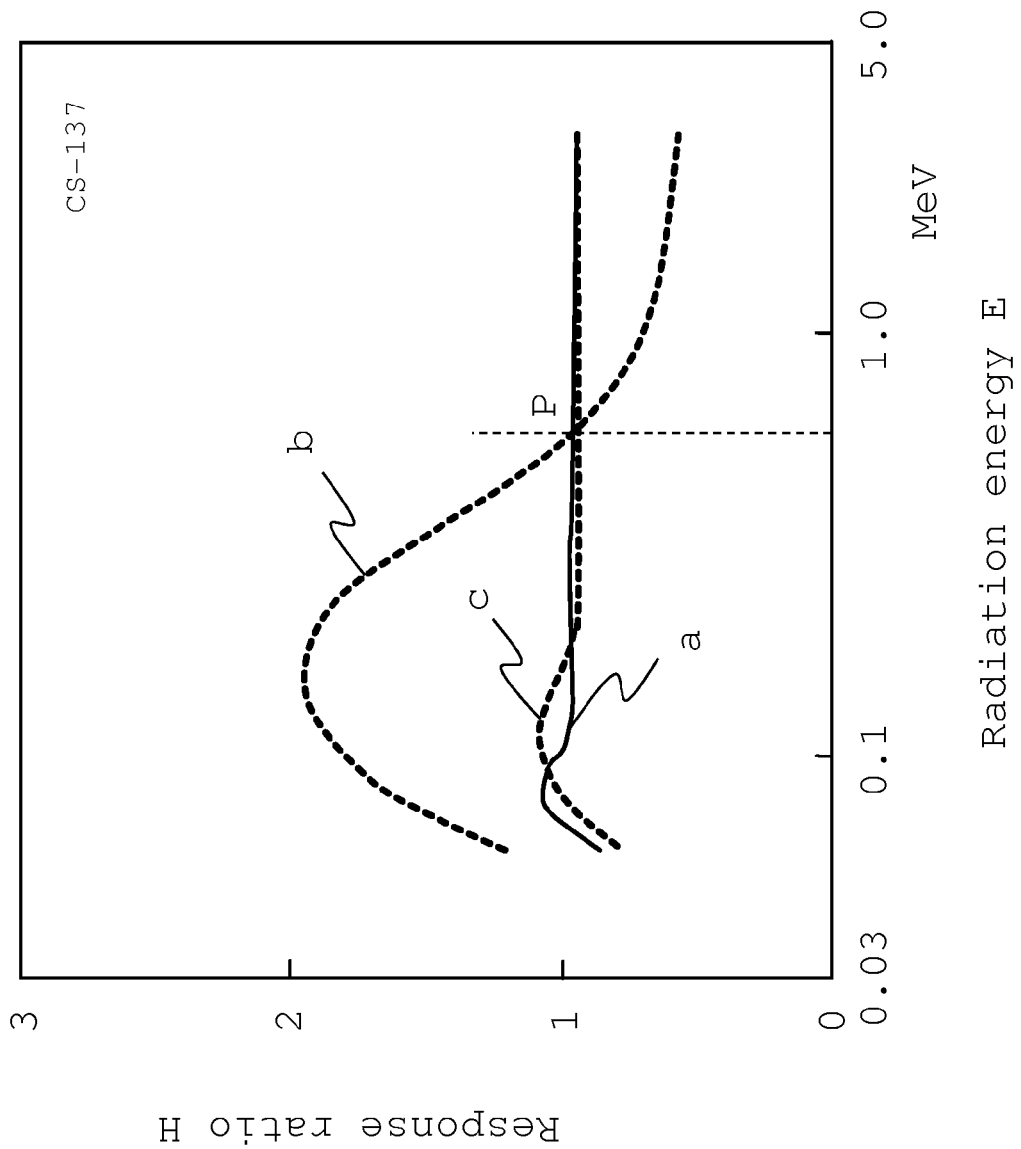
FIG. 2 is a diagram showing the energy characteristics of the dose rate measurement system according to the first embodiment.

Next, compensation of output energy characteristics by the energy characteristic compensation block 365 and a switching point of the dose rate Gi by the dose rate switching block 366 will be described. FIG. 2 is an example showing a result of the output energy characteristics of cesium (Cs)-137 in the dose rate measurement system 1. A horizontal axis shows input energy E (MeV) of radiation and a vertical axis shows a response ratio H of the dose rate measurement system 1 using a point P as a reference value 1, respectively. Reference letter a denotes output energy characteristics by the low range dose rate calculation block 363. Reference letter b denotes output energy characteristics before compensation by the high range dose rate calculation block 364; and reference letter c denotes output energy characteristics by the high range dose rate calculation block 364 after b is compensated. More particularly, the output energy characteristics b, which are not compensated by the high range dose rate calculation block 364, show that large distortion exists in a low energy region. However, good output energy characteristics can be obtained as shown in the output energy characteristics c compensated over the whole energy region by compensating the output energy characteristics by the energy characteristic compensation block 365. Incidentally, the output energy characteristics of the low range dose rate calculation block 363 can obtain good output energy characteristics equivalent to a in the low energy region by making a pulse height spectrum correspond sensitively to the dose rate Gi by the G(E) function. The reason why some amount of distortion is remained in the compensated output energy characteristics c, is caused by an instrumental error of the radiation detector 2.

Based on the ratio GiH/GiL between the low range dose rate GiL sent from the low range dose rate calculation block 363 and the high range dose rate GiH sent from the high range dose rate calculation block 364, the dose rate switching block 366 performs switching from the low range dose rate calculation block 363 to the high range dose rate calculation block 364 if GiH/GiL exceeds 1+k1; and the dose rate switching block 366 performs switching from the high range dose rate calculation block 364 to the low range dose rate calculation block 363 if GiH/GiL lowers to 1−k2. This case is designed so as to have hysteresis characteristics moderately by setting k1>k2. In this case, k1 and k2 are values to be set to suppress a level, difference due to switching to the minimum; and each of the values is a positive (+) value in order that an allowable level difference is within a range of accuracy or so that switching operation is reliably performed at the time of responding to a rapid rise.

Figure 3:
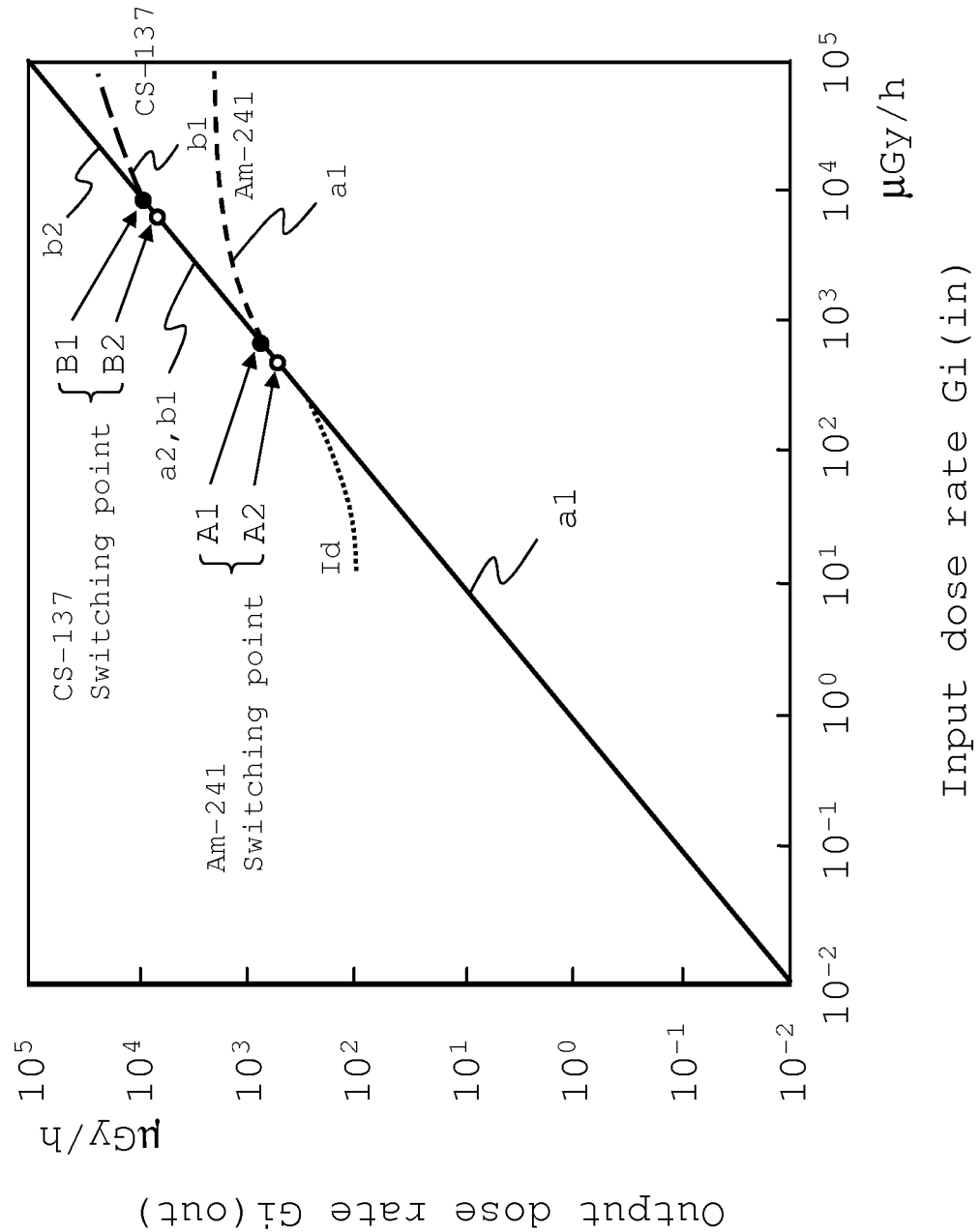
FIG. 3 is a diagram showing the relationship between an input dose rate of radiation and an optimum switching point in the first embodiment.

FIG. 3 shows the relationship between an input dose rate Gi of radiation and an optimum switching point. Reference letters/numerals a1 and a2 conceptually show the input/output response characteristics of the dose rate Gi of effective energy 57 keV of americium (Am)-241; a1 is the input/output response characteristics by the low range dose rate calculation block 363, the low dose rate side thereof is good in linearity, and the high dose rate side thereof has a tendency toward reduction (dashed line of Am-241) subsequent to saturation; and a2 is the input/output response characteristics by the high range dose rate calculation block 364, and shows good linearity with an increase of the input dose rate although a dark current Id (dotted line) of the radiation detector 2 is dominant on the low dose side. In this case, reference letter/numeral A1 denotes a switching point where GiH/GiL is at 1+k1, and A2 denotes a switching point where GiH/GiL is at 1+k2.

Reference letters/numerals b1 and b2 conceptually show the input/output response characteristics of the dose rate Gi of effective energy 660 keV of cesium (Cs)-137, which are shown in a shape that is linearly shifted to the high dose rate side by approximately one digit with respect to the characteristics of Am-241; b1 is the input/output response characteristics by the low range dose rate calculation block 363, the low dose rate side thereof is good in linearity, and the high dose rate side thereof has a tendency toward reduction (long dashed line of Cs-137) subsequent to saturation; and b2 is the input/output response characteristics by the high range dose rate calculation block 364, and shows good linearity with an increase of the input dose rate although the dark current Id of the radiation detector 2 is dominant on the low dose side. In this case, reference letter/numeral B1 denotes a switching point where GiH/GiL is at 1+k1, and B2 denotes a switching point where GiH/GiL is at 1+k2. In this manner, the dose rate switching block 366 searches the optimum switching point that fluctuates depending on the average energy Eav of radiation incident on the radiation detector 2 and performs switching based on the ratio GiH/GiL between the low range dose rate GiL that is an output from the low range dose rate calculation block 363 and the high range dose rate GiH that is an output from the high range dose rate calculation block 364.

An inorganic scintillation detector typified by the NaI(Tl) scintillation detector, a plastic scintillation detector, or a semiconductor detector typified by a Si semiconductor detector can be applicable to the radiation detector 2.

As described above, the energy characteristic compensation block 365 compensates the output energy characteristics of the high range dose rate GiH based on the average energy Eav obtained by measuring fluctuation; and therefore, a difference due to the difference of the output energy characteristics between the low range dose rate GiL and the high range dose rate GiH is considerably reduced. The dose rate switching block 366 automatically switches between the low range dose rate GiL sent from the low range dose rate calculation block 363 and the high range dose rate GiH sent from the high range dose rate calculation block 364 at the optimum switching point based on the ratio GiH/GiL between the low range dose rate GiL and the compensated high range dose rate GiH.

Consequently, in the method in which switching is performed by providing a lead filter on the radiation detector to suppress the level difference at the fixed switching point as in the conventional dose rate measurement system, there arise a problem in that the originally good output energy characteristics at the low range dose rate deteriorate; however, there is not such a problem in the dose rate measurement system of the first embodiment, output energy characteristics are good over the whole energy to be measured, linearity is good in the whole of the measurement range, the level difference at the switching point is suppressed, and measurement with a high accuracy and wide range dose rate can be achieved. Further, the pulse height spectrum generation block 361 generates a pulse height spectrum corresponding to the low range dose rate from the pulse height value Vp of the analog voltage pulse corresponding to the current pulse to be sent; and therefore, the presence of nuclide of Cs-134 and Cs-137 can be grasped over a long period of time during a fault of facilities.

As described above, the dose rate measurement system according to the first embodiment determines the optimum switching point of the outputs from the low range dose rate calculation block and the high range dose rate calculation block by the ratio between the low range dose rate and the high range dose rate; and therefore, remarkable effects are achieved in that output energy characteristics are good over the whole energy of radiation to be measured, linearity is good in the whole of the measurement range, the level difference at the switching point is suppressed, and a high accuracy and wide range dose rate can be measured.

Second Embodiment

Figure 4:
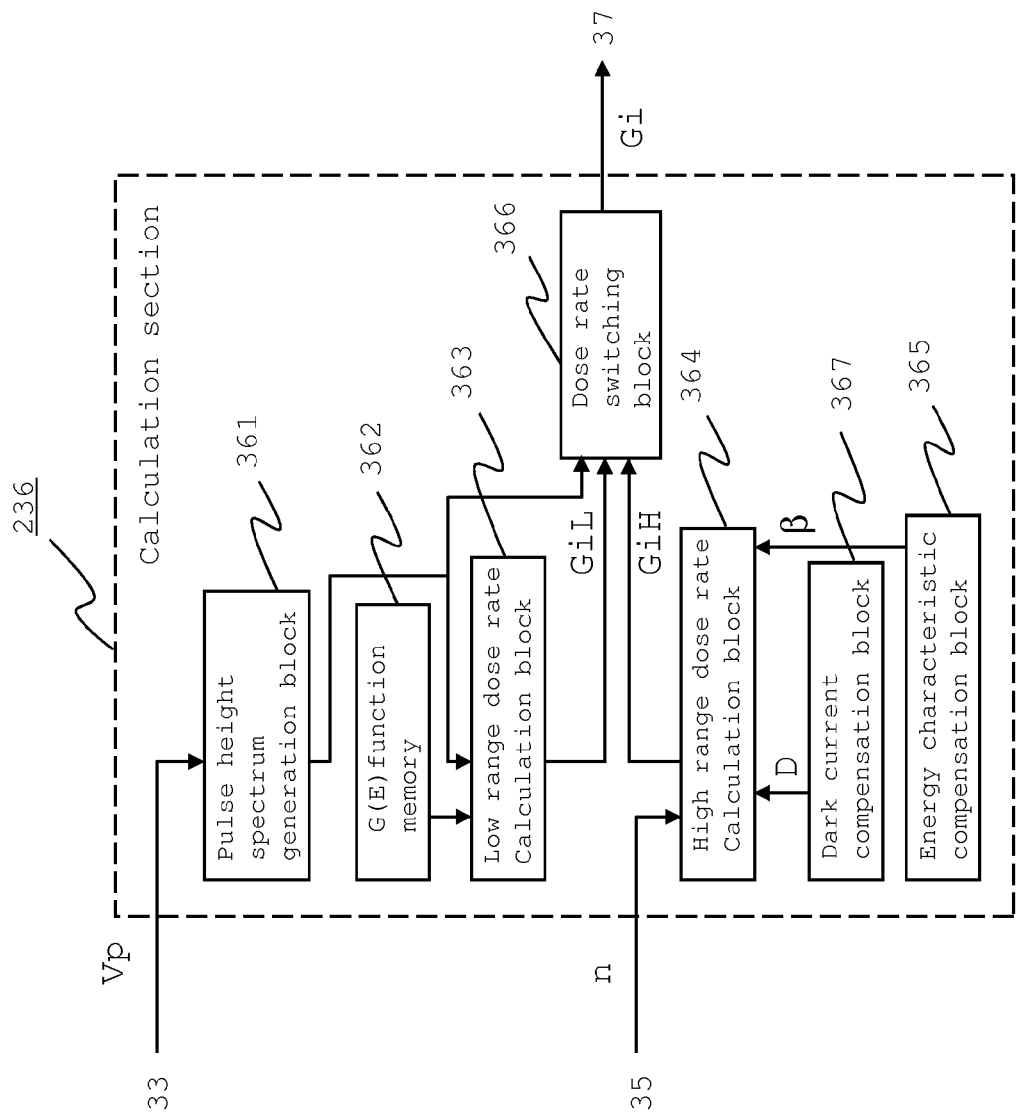
FIG. 4 is a diagram showing the configuration of a calculation section of a dose rate measurement system according to a second embodiment.

FIG. 4 is a diagram showing the configuration of a calculation section of a dose rate measurement system according to a second embodiment. A different point from the calculation section 36 of the dose rate measurement system 1 of the first embodiment is that a calculation section 236 of the second embodiment is provided with a dark current compensation block 367 as means of compensating dark current, by which the dark current of a radiation detector 2 at a high range dose rate in a high range dose rate calculation block 364 is compensated; and other constitutional elements are similar to the first embodiment and their description will be omitted.

Next, the operation of the dark current compensation block 367 will be described. The dark current compensation block 367 stores a dose rate D which is to be compensated corresponding to an average dark current Id of the radiation detector 2 at a reference temperature K0, the dose rate D being preliminarily set and applied from the display and operation section 37. As in the first embodiment, the high range dose rate calculation block 364 further subtracts the dose rate D corresponding to the dark current from a dose rate which is energy-compensated by the energy characteristic compensation block 365; and therefore, it becomes possible to measure a dose rate which is further better, higher accuracy, and wider range than the first embodiment in output energy characteristics near a switching point between the low range dose rate calculation block 363 and the high range dose rate calculation block 364.

As described above, as in the first embodiment, the dose rate measurement system according to the second embodiment performs energy compensation at the high range dose rate and compensates by subtracting the dose rate corresponding to the dark current of the radiation detector; and therefore, remarkable effects are achieved in that the output energy characteristics near the switching point between the low range dose rate calculation block and the high range dose rate calculation block can be improved and it becomes possible to measure a dose rate which is further better, higher accuracy, and wider range.

Third Embodiment

Figure 5:
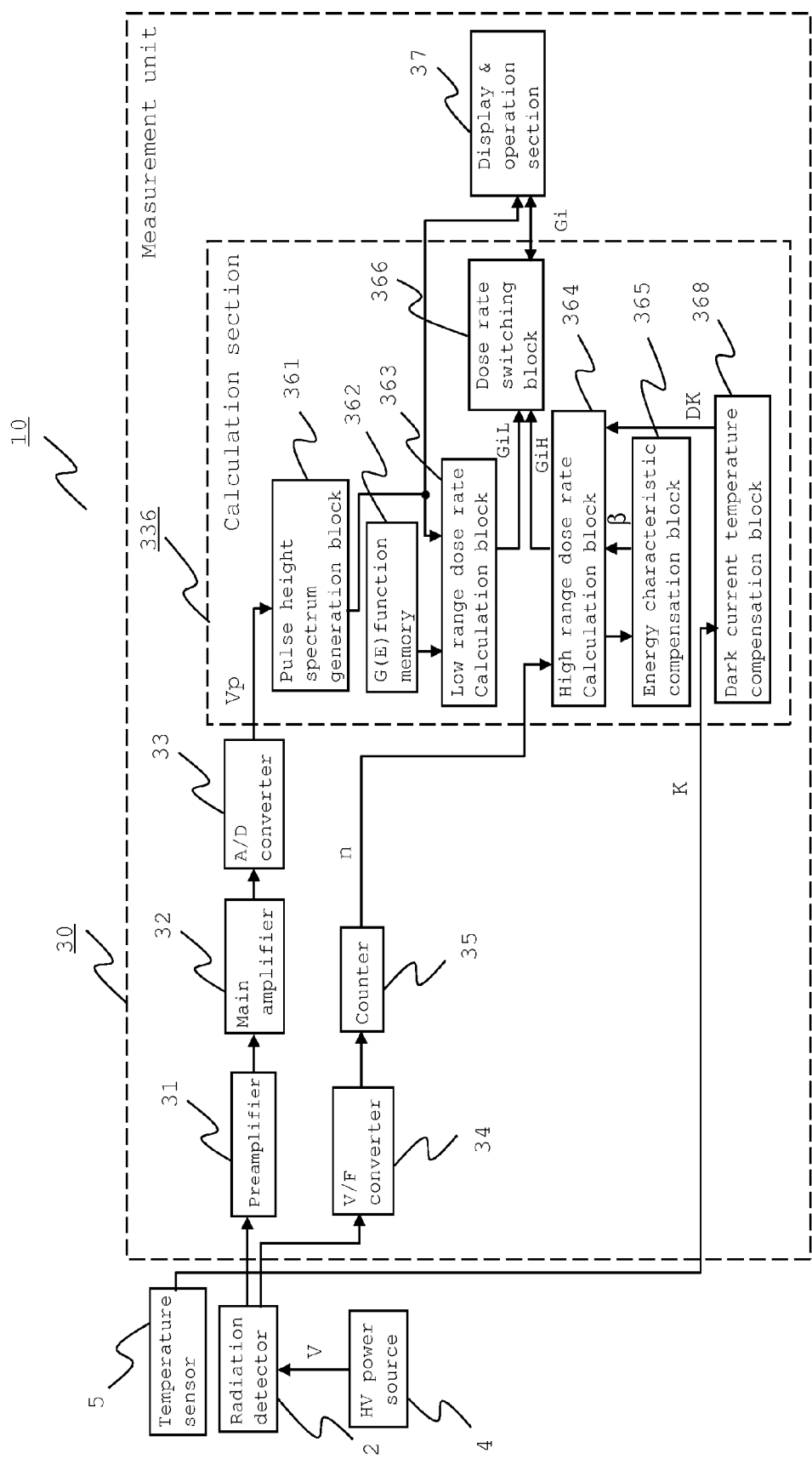
FIG. 5 is a diagram showing the configuration of a dose rate measurement system according to a third embodiment.
Figure 6:
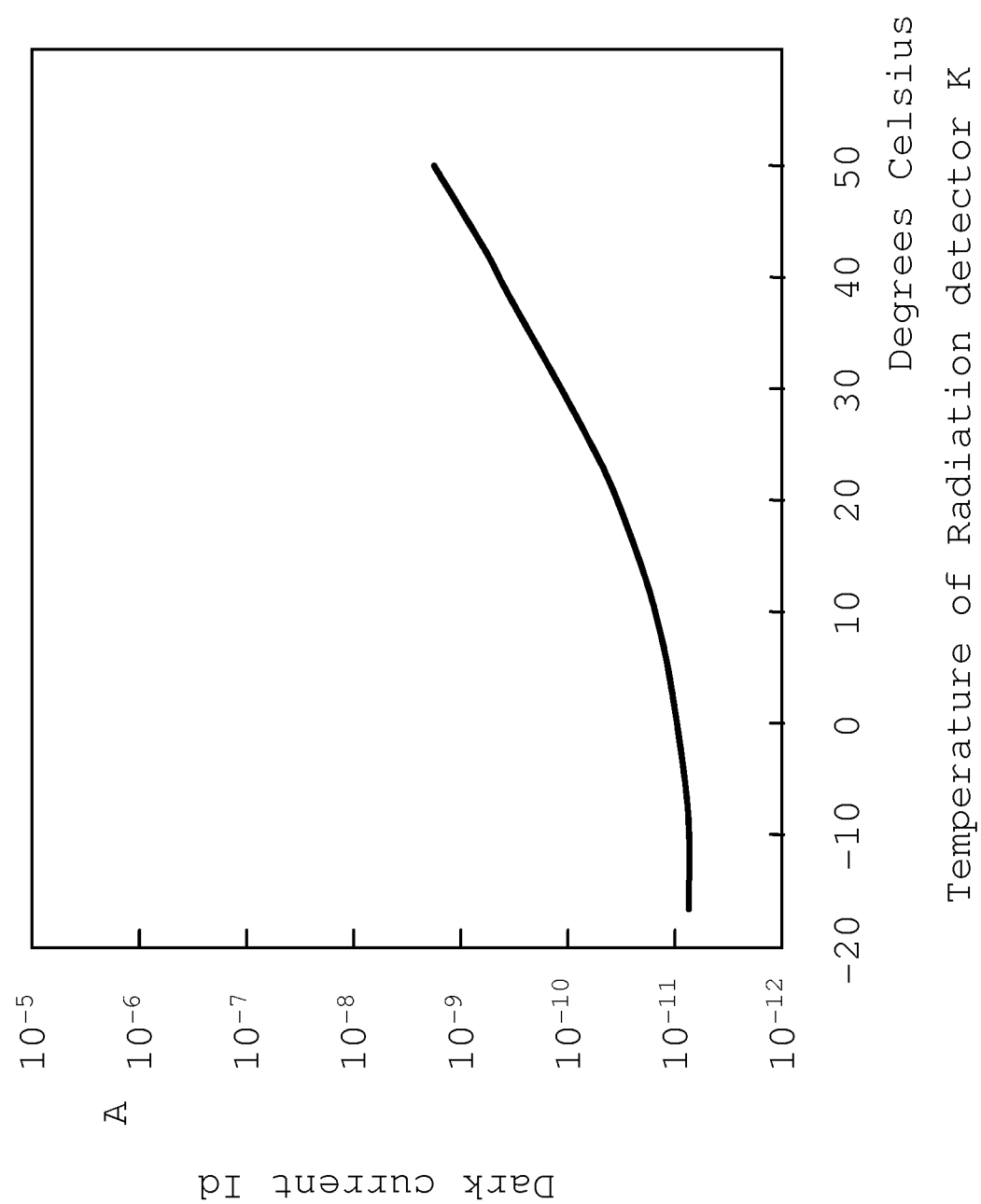
FIG. 6 is a diagram showing the temperature characteristics of dark current of a radiation detector in the third embodiment.

FIG. 5 is a diagram showing the configuration of a dose rate measurement system according to a third embodiment. FIG. 6 is a diagram showing the temperature characteristics of dark current of a radiation detector in the third embodiment. A different point from the dose rate measurement system 1 of the first embodiment is that: a dose rate measurement system 10 of the third embodiment is provided with a temperature sensor 5 that measures the temperature of a radiation detector 2; a dose rate of the dark current dependent on the temperature of the radiation detector 2 is calculated by a dark current temperature compensation block 368 based on temperature sent from the temperature sensor 5, the dark current temperature compensation block 368 being provided as means of compensating dark current temperature in the calculation section 336 of the measurement unit 30; and compensation is performed such that the high range dose rate calculation block 364 subtracts the dose rate of the dark current dependent on the temperature from a high range dose rate. Other constitutional elements are similar to the first embodiment and their description will be omitted.

Next, compensation of the dark current dependent on the temperature K of the radiation detector 2 in the dose rate measurement system 10 will be described. As shown in FIG. 5, the detected temperature K of the radiation detector 2 is sent from the temperature sensor 5 provided near the radiation detector 2. The dark current temperature compensation block 368 calculates a dose rate DK of a dark current Idk dependent on the temperature based on the temperature K; and, as in the first embodiment, the high range dose rate calculation block 364 subtracts the dose rate DK corresponding to the dark current Idk dependent on the temperature K from a dose rate which is energy-compensated by the energy characteristic compensation block 365 and sends it; and therefore, it becomes possible to measure a dose rate which is further better, higher accuracy, and wider range than the first embodiment and the second embodiment in output energy characteristics near a switching point between the low range dose rate calculation block 363 and the high range dose rate calculation block 364. Incidentally, the dark current temperature compensation block 368 preliminarily obtains, for example, the temperature characteristics of a dark current Id of the radiation detector 2 as shown in FIG. 6 by a type test and stores a corresponding table of the dose rate DK corresponding to the temperature K and the dark current Idk.

As described above, as in the first embodiment, the dose rate measurement system according to the third embodiment performs energy compensation at the high range dose rate and compensates by subtracting the dose rate corresponding to the dark current dependent on the temperature of the radiation detector; and therefore, remarkable effects are achieved in that the output energy characteristics near the switching point between the low range dose rate calculation block and the high range dose rate calculation block can be improved and it becomes possible to measure a dose rate which is further better, higher accuracy, and wider range.

Fourth Embodiment

Figure 7:
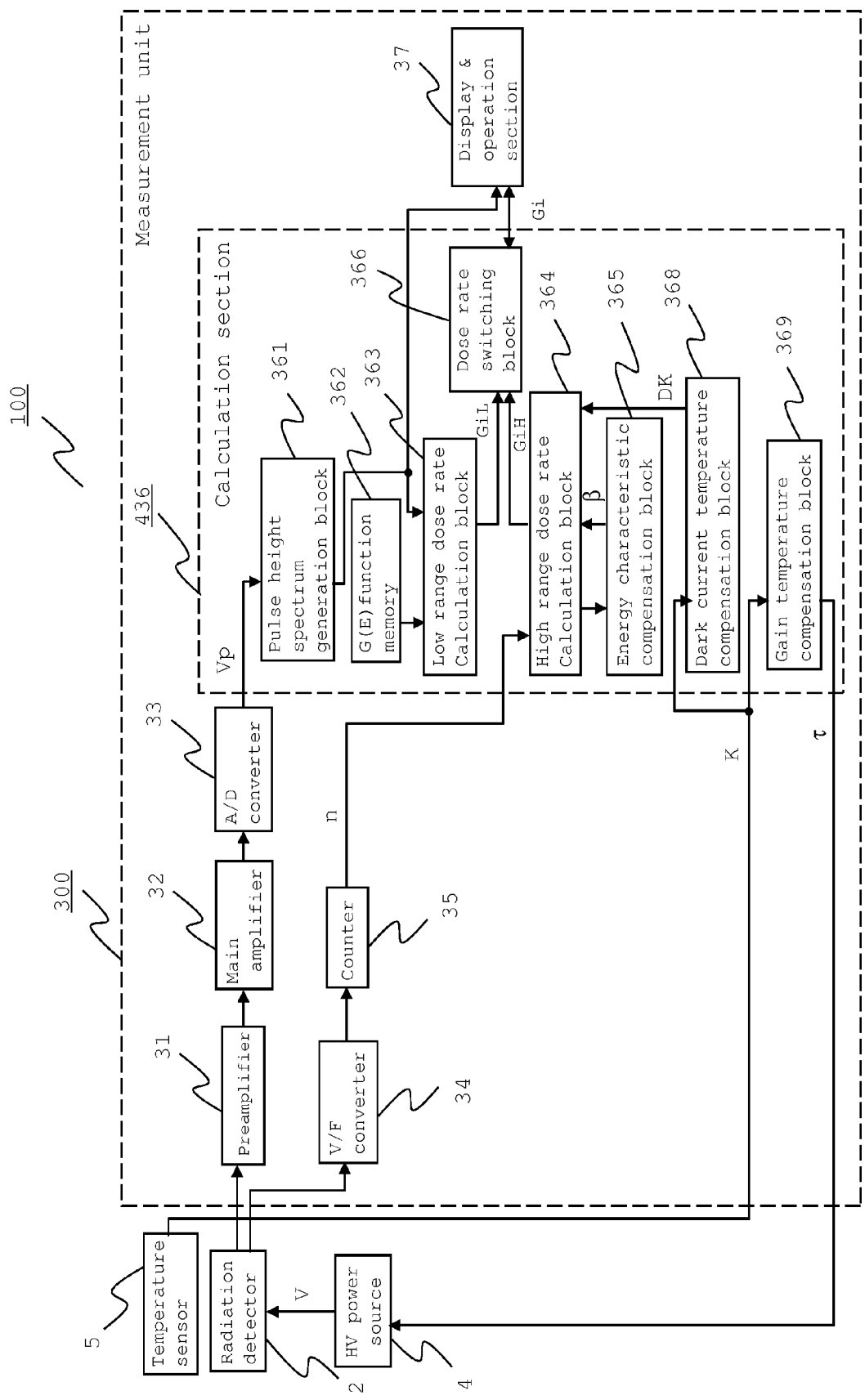
FIG. 7 is a diagram showing the configuration of a dose rate measurement system according to a fourth embodiment.
Figure 8:
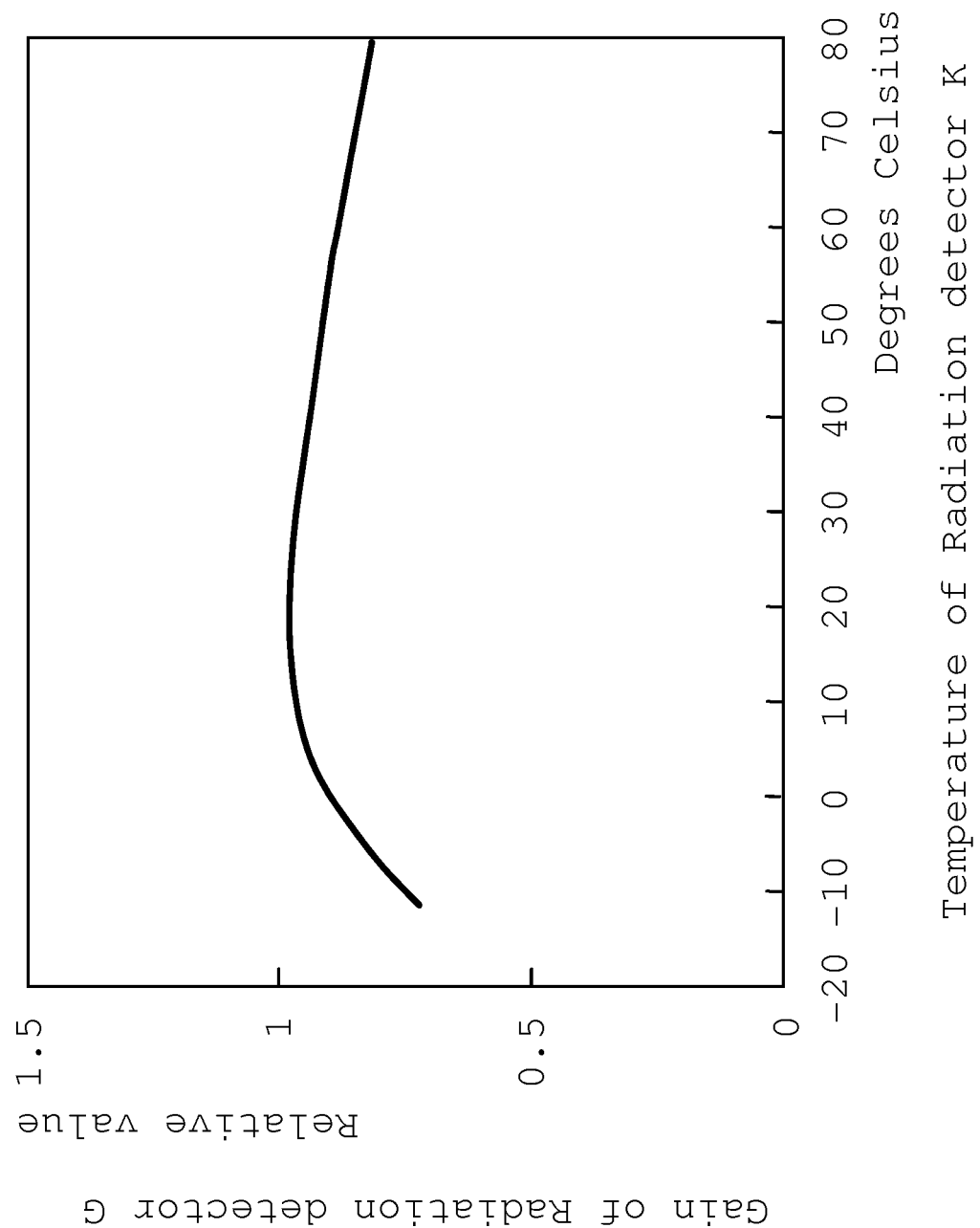
FIG. 8 is a diagram showing the temperature characteristics of a gain of a radiation detector in the fourth embodiment.

FIG. 7 is a diagram showing the configuration of a dose rate measurement system according to a fourth embodiment; and FIG. 8 is a diagram showing the temperature characteristics of a gain of a radiation detector in the fourth embodiment. A different point from the dose rate measurement system 10 of the third embodiment is that a dose rate measurement system 100 of the fourth embodiment is provided with a gain temperature compensation block 369 as means of compensating gain temperature in a calculation section 436 of a measurement unit 300 and high voltage of a high voltage power source is controlled by the gain temperature compensation block 369 based on temperature sent from a temperature sensor 5 to also compensate temperature dependent property of a gain of a radiation detector 2; and other constitutional elements are similar to the third embodiment and their description will be omitted.

Next, compensation of the gain dependent on the temperature of the radiation detector 2 in the dose rate measurement system 100 will be described. As shown in FIG. 8, gain G of the radiation detector 2 depends on the temperature K of the radiation detector 2. The gain temperature compensation block 369 controls a high voltage V of the high voltage power source 4 so that the temperature dependent property of the gain G of the radiation detector 2 is compensated based on the temperature K of the radiation detector 2 detected by the temperature sensor 5. Incidentally, the gain temperature compensation block 369 preliminarily obtains, for example, the temperature characteristics of the gain G of the radiation detector 2 as shown in FIG. 8 by a type test and stores a corresponding table between the high voltage V and the gain G corresponding to a gain temperature compensation coefficient τ that compensates the temperature dependent property of the gain G of the radiation detector 2 at the temperature K. The gain temperature compensation block 369 compensates the temperature dependent property of the gain G by controlling the high voltage V of the high voltage power source 4 based on a temperature signal of the radiation detector 2 from the temperature sensor 5; and therefore, there can be obtained a high accuracy and wide range dose rate measurement system in which the temperature characteristics are good in the whole of the measurement range.

As described above, as in the first embodiment through the third embodiment, the dose rate measurement system according to the fourth embodiment performs energy compensation at the high range dose rate and also compensates the gain dependent on the temperature of the radiation detector; and therefore, remarkable effects are achieved in that it becomes possible to measure a dose rate which is further better, higher accuracy, and wider range.

Furthermore, in the present invention, the respective embodiments can be freely combined and appropriately changed or omitted within the scope of the present invention.

Besides, the same reference numerals as those shown in the drawings represent the same or corresponding elements.

Various modifications and alternations of this invention will be apparent to those skilled in the art without departing from the scope and spirit of this invention, and it should be understood that this is not limited to the illustrative embodiments set forth herein.

What is claimed is:

1. A dose rate measurement system comprising:
   a radiation detector which absorbs incident radiation energy, sends a current pulse proportional to the energy, and sends a DC voltage proportional to the energy;
   means of generating a pulse height spectrum, which converts electric charge carried by the current pulse to an analog voltage pulse, extracts a pulse height value from the analog voltage pulse, and generates a pulse height spectrum from the pulse height value to be sent;
   means of calculating a low range dose rate, which converts the pulse height spectrum to a dose rate to be calculated as a low range dose rate in a fixed cycle;
   means of compensating energy characteristics, which measures fluctuation of the DC voltage, estimates average energy of the radiation, and derives an energy compensation coefficient;
   means of calculating a high range dose rate, which converts the DC voltage to a dose rate, and multiplies the converted dose rate by the energy compensation coefficient to be calculated as a high range dose rate in a fixed cycle; and
   means of switching dose rates, which switches to either the low range dose rate or the high range dose rate to be sent as a dose rate based on the ratio between the low range dose rate and the high range dose rate.

2. A dose rate measurement system according to claim 1, further comprising means of compensating dark current, which stores a dark current dose rate corresponding to a dark current at the reference temperature of said radiation detector, and compensates by subtracting the dark current dose rate from the high range dose rate.

3. A dose rate measurement system according to claim 1, further comprising:
   a temperature sensor which detects the temperature of said radiation detector; and
   means of compensating dark current temperature, which stores a dark current dose rate corresponding to the temperature of said radiation detector, and compensates by subtracting the dark current dose rate according to the temperature from the high range dose rate.

4. A dose rate measurement system according to claim 3, further comprising:
   a high voltage power source which supplies a high voltage that operates said radiation detector; and
   means of compensating gain temperature, which stores the temperature characteristics of a gain of said radiation detector, controls the output of the high voltage of said high voltage power source depending on the temperature, and compensates the gain of said radiation detector.

* * * * *